US012567736B2

(12) United States Patent
Kim

(10) Patent No.: US 12,567,736 B2
(45) Date of Patent: Mar. 3, 2026

(54) INRUSH CURRENT REDUCTION CIRCUIT

(71) Applicant: SAMSUNG SDI CO., LTD., Yongin-si (KR)

(72) Inventor: Byeong Jo Kim, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 144 days.

(21) Appl. No.: 18/400,171

(22) Filed: Dec. 29, 2023

(65) Prior Publication Data

US 2025/0141217 A1 May 1, 2025

(30) Foreign Application Priority Data

Oct. 26, 2023 (KR) ......................... 10-2023-0144717

(51) Int. Cl.
*H02H 9/04* (2006.01)
(52) U.S. Cl.
CPC .................................... *H02H 9/04* (2013.01)
(58) Field of Classification Search
CPC .. H02H 9/04; H02H 9/001; H02H 3/08; H02J 7/00304; H02J 7/00714; H02J 7/0029
USPC ....................................... 361/93.9
See application file for complete search history.

(56) References Cited

U.S. PATENT DOCUMENTS

| | | | | | |
|---|---|---|---|---|---|
| 5,198,957 | A | * | 3/1993 | Welty ....................... | H02H 3/20 |
| | | | | | 361/111 |
| 6,049,446 | A | * | 4/2000 | Ha ......................... | H02H 9/001 |
| | | | | | 340/653 |
| 7,365,584 | B2 | * | 4/2008 | Bennett ................ | H03K 17/166 |
| | | | | | 327/170 |
| 2007/0053124 | A1 | * | 3/2007 | Bolz ...................... | H02H 3/202 |
| | | | | | 361/82 |
| 2007/0252565 | A1 | * | 11/2007 | Wang ..................... | G05F 1/573 |
| | | | | | 323/277 |
| 2010/0182726 | A1 | * | 7/2010 | Xiong .................... | H02H 9/001 |
| | | | | | 361/93.9 |
| 2012/0026632 | A1 | * | 2/2012 | Acharya .............. | H03K 17/081 |
| | | | | | 361/56 |
| 2012/0188675 | A1 | * | 7/2012 | Oppermann .......... | H01F 7/1811 |
| | | | | | 361/91.5 |
| 2013/0265683 | A1 | * | 10/2013 | Gueltig ................... | G05F 1/56 |
| | | | | | 361/86 |

(Continued)

FOREIGN PATENT DOCUMENTS

| | | | | |
|---|---|---|---|---|
| CN | 103138247 A | | 6/2013 | |
| CN | 204131110 U | * | 1/2015 | |

(Continued)

OTHER PUBLICATIONS

Extended European Search Report issued on Oct. 14, 2024, in the corresponding European Patent Application No. 24164870.8.

*Primary Examiner* — Dharti H Patel
(74) *Attorney, Agent, or Firm* — Lee IP Law, P.C.

(57) ABSTRACT

An inrush current reduction circuit includes a switching element connected between a power side of a BMS module and a power side of a battery cell module and having a gate connected to a ground side through a first resistor, a diode connected at one side thereof to a source of the switching element, a second resistor connected at one side thereof to the other side of the diode and connected at the other side thereof to the ground side through the first resistor, and a Zener diode connected in parallel to the second resistor.

13 Claims, 7 Drawing Sheets

(56) References Cited

U.S. PATENT DOCUMENTS

| 2015/0222110 A1* | 8/2015 | Sidapara ............... | H02H 7/1213 |
| | | | 361/93.7 |
| 2016/0154414 A1* | 6/2016 | Schwerman ........... | H02H 9/001 |
| | | | 323/281 |
| 2019/0199340 A1* | 6/2019 | Plesnik ................ | H03K 17/145 |
| 2020/0067305 A1* | 2/2020 | Zhu ........................ | H02H 9/001 |
| 2021/0376596 A1* | 12/2021 | Kim ....................... | H02H 9/005 |
| 2025/0141217 A1* | 5/2025 | Kim ....................... | H02H 9/001 |

FOREIGN PATENT DOCUMENTS

| EP | 3961852 A1 * | 3/2022 | .......... H01M 50/574 |
| EP | 4546589 A1 * | 4/2025 | .......... H02J 7/00714 |
| JP | H05328599 A * | 12/1993 | |
| KR | 20210052800 A * | 5/2021 | ............. H02H 1/043 |

* cited by examiner

FIG.3

INRUSH CURRENT REDUCTION CIRCUIT

CROSS-REFERENCE TO RELATED APPLICATION

The present application claims the benefit of Korean Patent Application No. 10-2023-0144717, filed on Oct. 26, 2023 in the Korean Intellectual Property Office, the entire disclosure of which is incorporated herein by reference.

BACKGROUND

1. Field

The present disclosure relates to an inrush current reduction circuit that can reduce generation of an inrush current upon connection of a battery management system (BMS) module to a battery cell module.

2. Description of the Related Art

In a modular application that typically requires connection between a BMS module and a battery cell module, an inrush current generated due to inductance and capacitance components of the BMS module and the battery cell module can cause damage to circuit elements upon connection of the BMS module to the battery cell module.

Therefore, an inrush current reduction circuit capable of reducing generation of an inrush current that can be generated upon connection of the BMS module and the battery cell module, is desirable.

SUMMARY

Embodiments are directed to an inrush current reduction circuit, including a switching element connected between a power side of a BMS module and a power side of a battery cell module and having a gate connected to a ground side through a first resistor, a diode connected at one side thereof to a source of the switching element, a second resistor connected at one side thereof to the other side of the diode and connected at the other side thereof to the ground side through the first resistor; and a Zener diode connected in parallel to the second resistor.

The inrush current reduction circuit, wherein the switching element may include a P-CH field effect transistor (FET).

The inrush current reduction circuit, wherein a drain of the switching element may be connected to the power side of the BMS module.

The inrush current reduction circuit, wherein the source of the switching element may be connected to the power side of the battery cell module.

The inrush current reduction circuit, wherein an anode of the diode may be connected to the source of the switching element.

The inrush current reduction circuit, wherein the Zener diode may be connected between one side of the first resistor and the other side of the diode.

The inrush current reduction circuit, wherein an anode of the Zener diode may be connected to one side of the first resistor and a cathode of the Zener diode may be connected to a cathode of the diode.

The inrush current reduction circuit, wherein the switching element may cut off an inrush current generated at an initial stage of connection between the BMS module and the battery cell module in an OFF state and may be turned on to allow only part of the inrush current to flow therethrough using voltage distribution by the first resistor and the second resistor if a voltage (Vgs) between both ends of the second resistor reaches a threshold voltage (Vth) or more, as a voltage level of the inrush current continues to increase.

The inrush current reduction circuit, wherein the switching element may further include a capacitor and a third resistor connected in parallel to both ends of the switching element.

The inrush current reduction circuit, wherein the capacitor and the third resistor may be connected in series to the switching element.

The inrush current reduction circuit, wherein a voltage applied to an input terminal of the switching element may be adjusted depending on capacitance of the capacitor and resistance of the third resistor.

BRIEF DESCRIPTION OF DRAWINGS

Features will become apparent to those of ordinary skill in the art by describing in detail exemplary embodiments with reference to the attached drawings in which:

FIG. 3 is a circuit diagram of an inrush current reduction circuit according to one or more embodiments.

DETAILED DESCRIPTION

Figure 1:
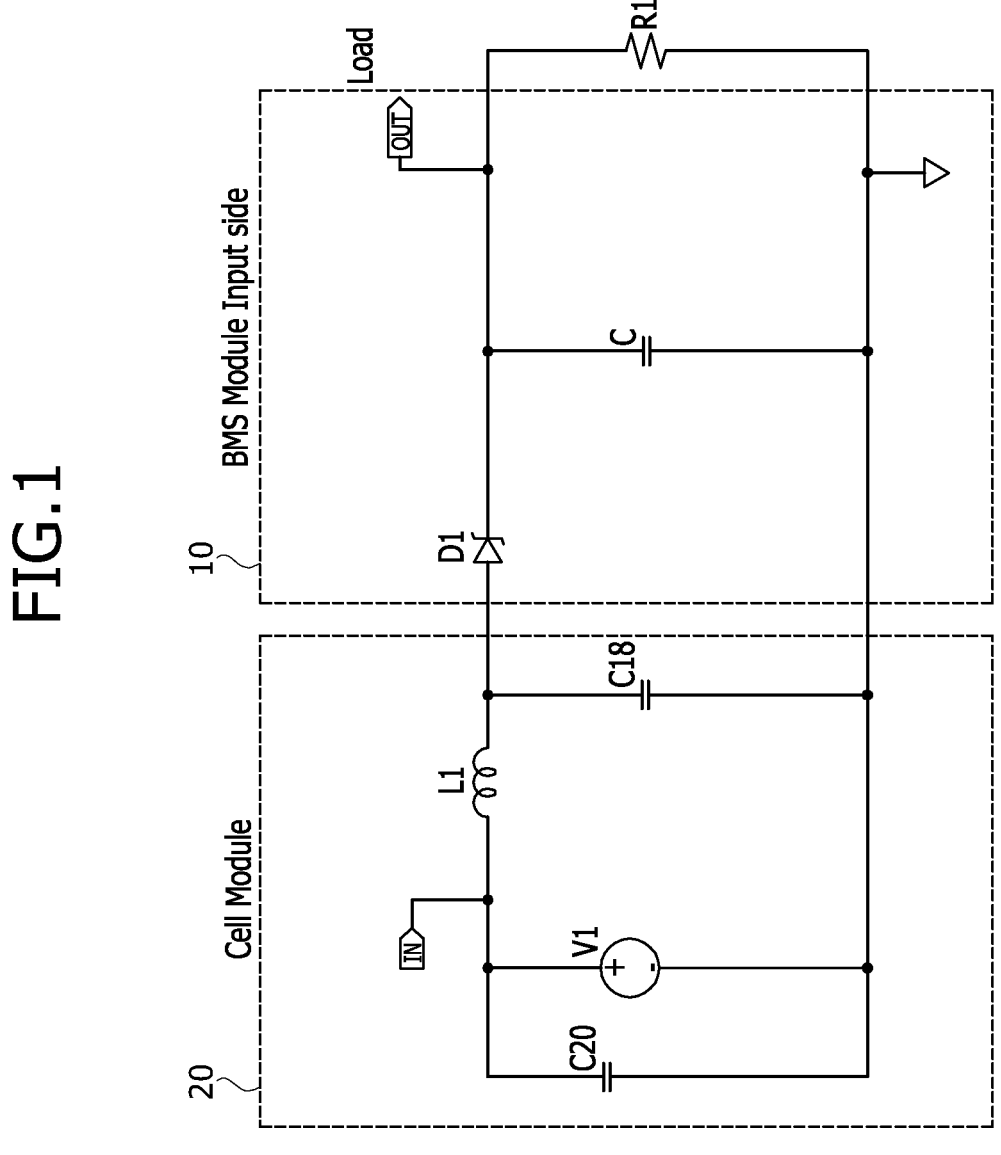
FIG. 1 is a circuit diagram of a typical connection circuit between a BMS module and a battery cell module.

Hereinafter, embodiments of the present disclosure will be described, in detail, with reference to the accompanying drawings. The terms or words used in this specification and claims should not be construed as being limited to the usual or dictionary meaning and should be interpreted as meaning and concept consistent with the technical idea of the present disclosure based on the principle that the inventor can be his/her own lexicographer to appropriately define the concept of the term to explain in the best way.

The embodiments described in this specification and the configurations shown in the drawings are only some of the embodiments of the present disclosure and do not represent all of the technical ideas, embodiments, and features of the present disclosure. Thus, it should be understood that there may be various equivalents and modifications that can replace or modify the embodiments described herein at the time of filing this application.

It will also be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. In some embodiments, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. When phrases such as "at least one of A, B and C, "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In some embodiments, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112 (a) and 35 U.S.C. § 132 (a).

Throughout the specification, unless otherwise stated, each element may be singular or plural.

When an arbitrary element is referred to as being disposed (or located or positioned) on the "above (or below)" or "on (or under)" a component, it may mean that the arbitrary element is placed in contact with the upper (or lower) surface of the component and may also mean that another component may be interposed between the component and any arbitrary element disposed (or located or positioned) on (or under) the component.

It will also be understood that when an element is referred to as being "coupled," "linked" or "connected" to another element, the elements may be directly "coupled," "linked" or "connected" to each other, or an intervening element may be present therebetween, through which the element may be "coupled," "linked" or "connected" to another element. In some embodiments, if a part is referred to as being "electrically coupled" to another part, the part can be directly connected to another part or an intervening part may be present therebetween such that the part and another part are indirectly connected to each other.

Throughout the specification, when "A and/or B" is stated, it means A, B or A and B, unless otherwise stated. In this disclosure, "and/or" includes any or all combinations of a plurality of items enumerated. When "C to D" is stated, it means C or more and D or less, unless otherwise specified.

FIG. 1 is a circuit diagram of a typical connection circuit between a BMS module and a battery cell module.

Referring to FIG. 1, typically, an inrush current reduction circuit is not present between a BMS module 10 (only an input side of the BMS module is shown in FIG. 1 for ease of description) and a battery cell module 20.

In this structure, a high voltage level of inrush current is generated upon connection of the BMS module 10 to the battery cell module 20.

Figure 2:
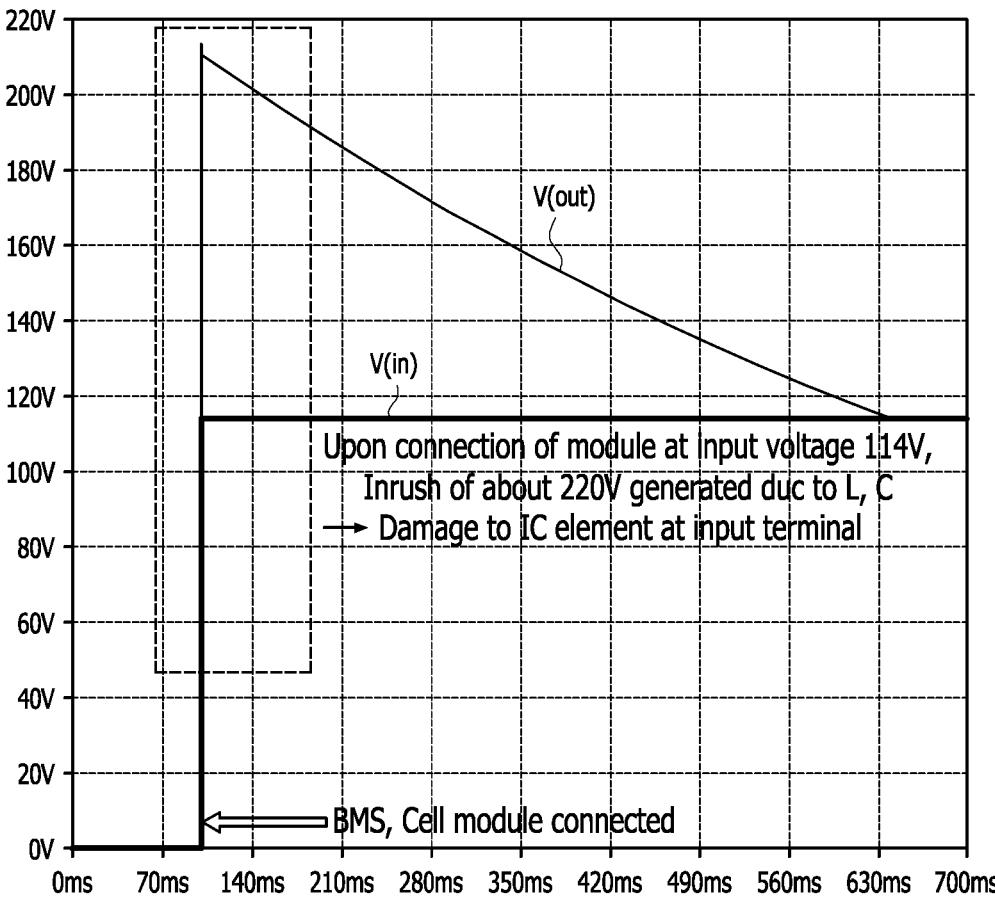
FIG. 2 is a graph illustrating an inrush current waveform generated upon connection of the BMS module to the battery cell module in FIG. 1.

FIG. 2 is a graph illustrating an inrush current waveform generated upon connection of the BMS module to the battery cell module in FIG. 1.

Referring to FIG. 2, upon connection of the battery cell module 20 at an input voltage of 114V, an inrush current of about 220V may be instantaneously generated due to inductance and capacitance components, thereby causing damage to circuit elements of the BMS module 10.

In embodiments, an inrush current reduction circuit 110; 120 (see FIG. 3 and FIG. 5) is disposed between the BMS module 10 and the battery cell module 20 to reduce generation of an inrush current that can be generated upon connection of the BMS module 10 to the battery cell module 20, thereby preventing damage to the circuit elements of the BMS module 10.

Figure 3:
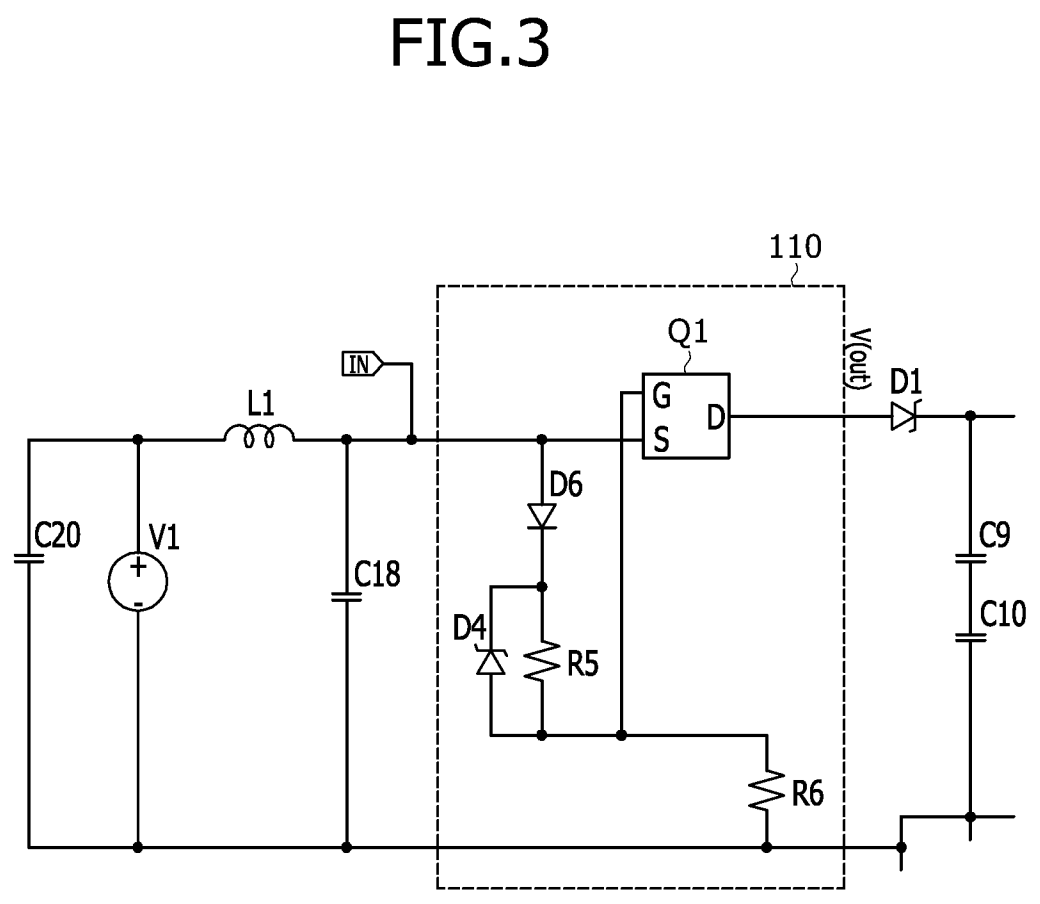

FIG. 3 is a schematic circuit diagram of an inrush current reduction circuit according to one or more embodiments.

Referring to FIG. 3, an inrush current reduction circuit 110 according to embodiments includes a switching element Q1 in which a drain may be connected to a power side of a BMS module 10, a source may be connected to a power side of the battery cell module 20, and a gate may be connected to a ground side through a first resistor R6, a diode D6 having an anode connected to the source of the switching element Q1, a second resistor R5 may be connected at one side thereof to a cathode of the diode D6 and may be connected at the other side thereof to the ground side through the first resistor R6, and a Zener diode D4 may be connected in parallel to the second resistor R5.

In this example implementation, the switching element Q1 may include a P-CH FET (Field Effect Transistor) and the Zener diode D4 may have an anode connected to one side of the first resistor R6 and a cathode connected to the cathode of the diode D6.

For reference, a typical inrush current prevention circuit includes a resistor and a switch connected to each other in parallel to prevent an inrush current by controlling the switch.

Unlike the typical inrush current reduction circuit, the inrush current reduction circuit according to embodiments is configured to prevent generation of an inrush current at an initial stage of connection of modules while allowing the switching element Q1 to operate at a preset voltage or more using an RC circuit (see FIG. 5) and the switching element Q1 (see FIG. 3) without control of the switch.

Figure 4A:
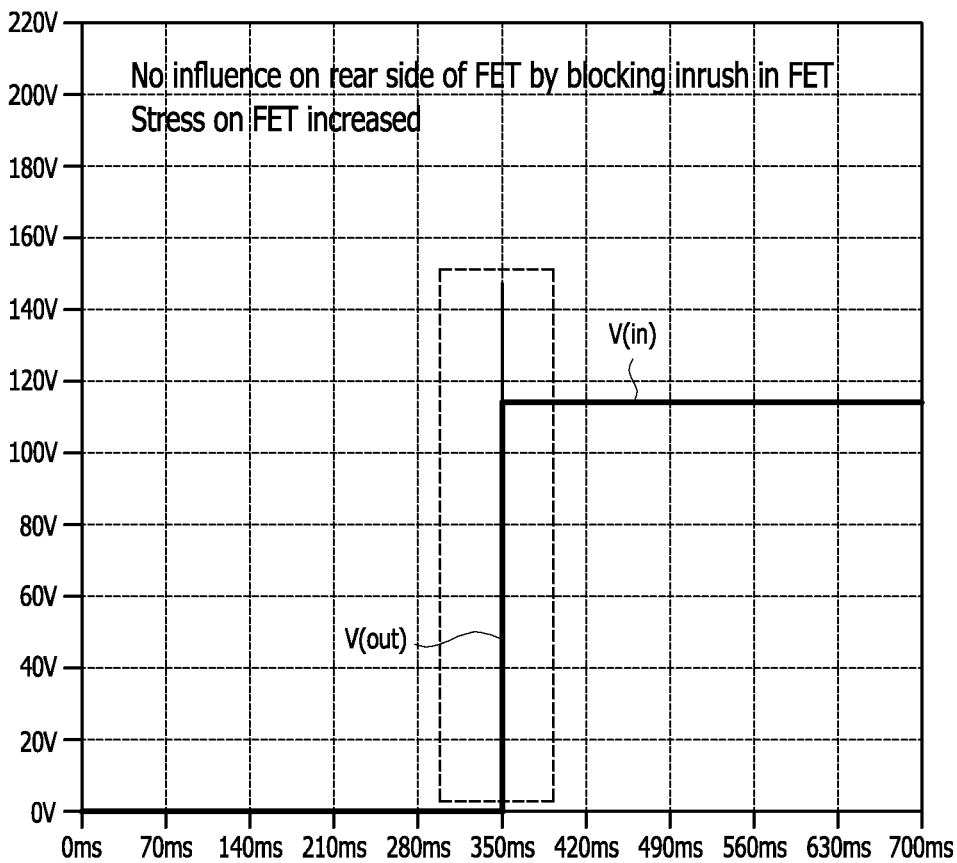
FIGS. 4A-4B are graphs illustrating operation of a switching element of the inrush current reduction circuit of FIG. 3 according to an inrush current generated upon connection of a BMS module to a battery cell module.
Figure 4B:
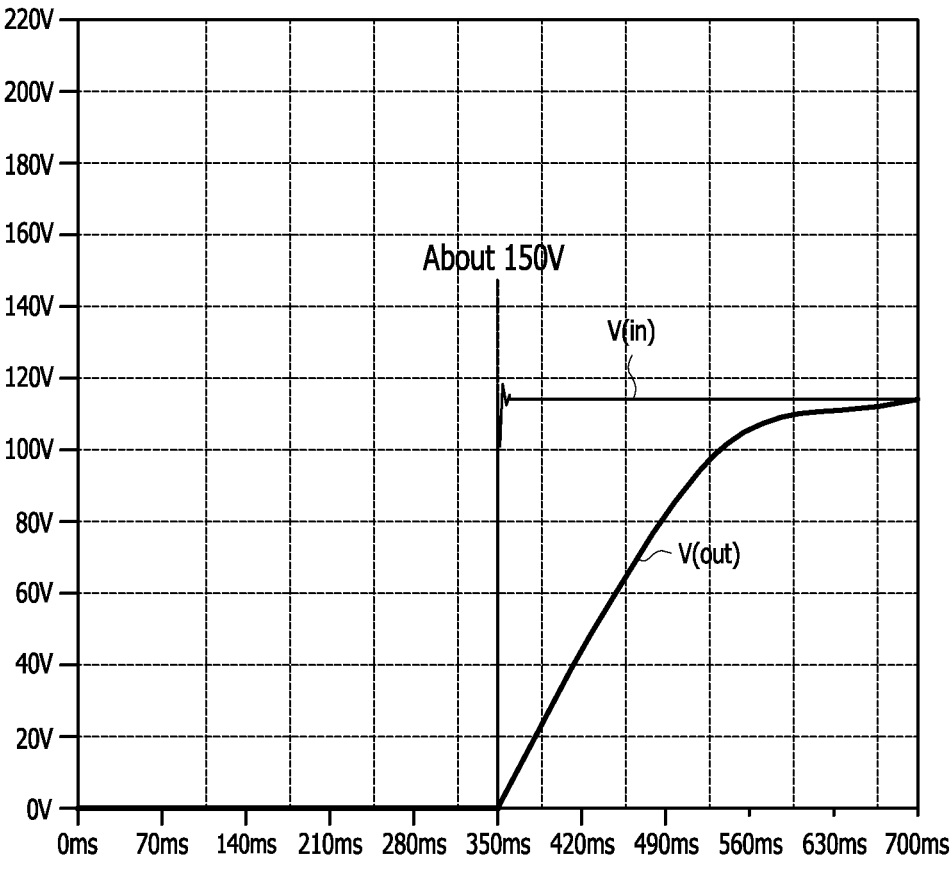

FIGS. 4A-4B are graphs illustrating operation of the switching element of the inrush current reduction circuit of FIG. 3 according to inrush current generated upon connection of the BMS module to the battery cell module.

Referring to FIG. 4A, because an inrush current generated at an initial stage of connection between the BMS module 10 and the battery cell module 20 is blocked by the switching element Q1 in an OFF state, the inrush current may not be transmitted to the BMS module 10.

However, if a voltage level of the inrush current continues to increase, stress on the switching element Q1 increases.

Referring to FIG. 4B, after the BMS module 10 and the battery cell module 20 are connected to each other, if the voltage level of the inrush current continues to increase, i.e., if a voltage Vgs between both ends of the second resistor R5 reaches a threshold voltage Vth or more using voltage distribution by the first resistor R6 and the second resistor R5, the switching element Q1 may be turned on to allow part of the inrush current to flow therethrough.

Figure 5:
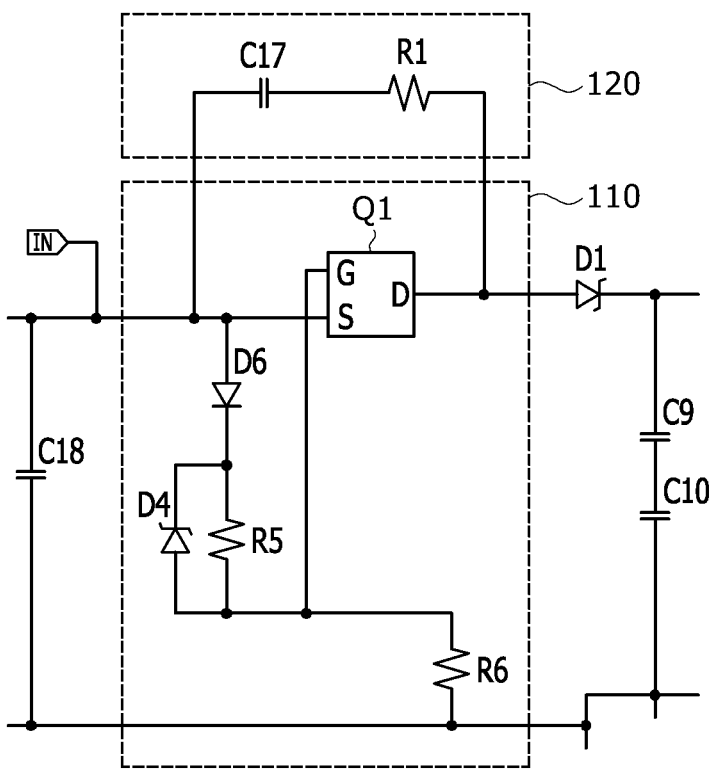
FIG. 5 is a circuit diagram of an inrush current reduction circuit according to another implementation.

FIG. 5 is a circuit diagram of an inrush current reduction circuit according to one or more embodiments.

Referring to FIG. 5, the inrush current reduction circuit 120 according to some embodiments may further include a capacitor C17 and a third resistor R1 connected in series between the gate and the drain of the switching element Q1 of the inrush current reduction circuit 110 according to example embodiments, such as that shown in FIG. 3.

The capacitor C17 and the third resistor R1 connected in parallel between the gate and the drain of the switching element Q1 may allow a current to flow to the capacitor C17 and the third resistor R1 connected in parallel to each other if the BMS module 10 and the battery cell module 20 are connected to each other, and due to the characteristics of the capacitor C17, no current flows after a period of time, depending on capacitance of the capacitor, if voltage change does not occur.

In this example implementation, the capacitor C17 and the third resistor R1 may be connected in series to the switching element.

Assuming that about 150 V is applied to the input terminal of the switching element Q1 before a circuit of the capacitor C17 and the third resistor R1 connected in series between the gate and the drain of the switching element Q1 is provided (see FIG. 4B), the presence of the circuit of the capacitor C17 and the third resistor R1 connected in series between the gate and the drain of the switching element Q1 may allow about 125 V, in some embodiments, a voltage reduced from 150 V by about 25 V, to be applied to the input terminal of the switching element Q1, thereby providing an effect of reducing stress on the switching element Q1.

In this example implementation, the voltage applied to the input terminal of the switching element Q1 may be adjusted according to capacitance of the capacitor C17 and resistance of the third resistor R1.

Figure 6:
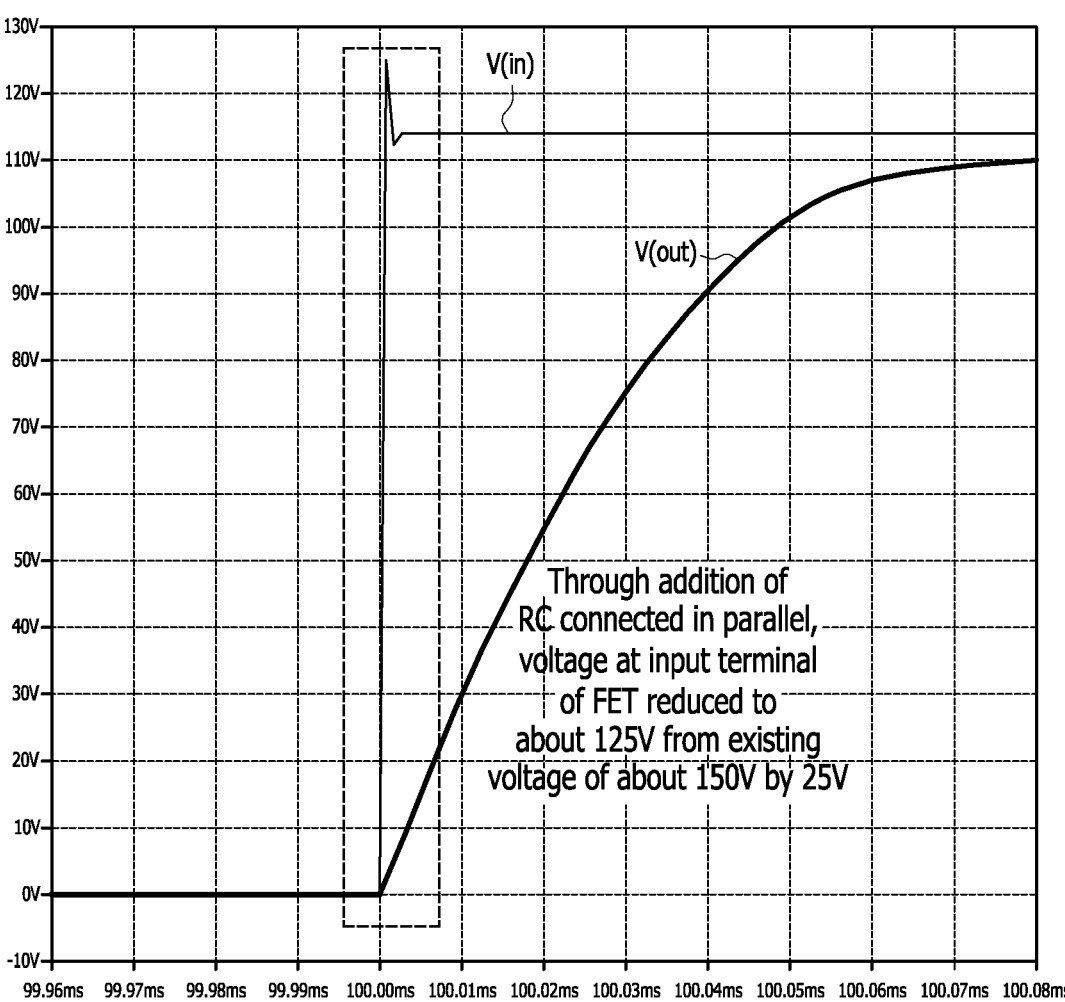
FIG. 6 is a graph of a voltage waveform illustrating reduction in voltage applied to an input terminal of a switching element shown in FIG. 5, where a circuit of a capacitor and a resistor connected in series between a gate and a drain of the switching element is provided.

FIG. 6 is a graph of a voltage waveform illustrating reduction in voltage applied to the input terminal of the switching element Q1 shown in FIG. 5, if the circuit of the capacitor C17 and the resistor R1 connected in series between the gate and the drain of the switching element Q1 is provided.

Referring to FIG. 6 and FIG. 4B, it can be seen that the presence of the circuit of the capacitor C17 and the third resistor R1 circuit connected in series between the gate and the drain of the switching element Q1 allows a voltage reduced to about 125 V (i.e., a voltage reduced from 150 V by about 25 V) to be applied to the input terminal of the switching element Q1, thereby providing the effect of reducing stress on the switching element Q1.

As described above, the inrush current reduction circuit according to embodiments can prevent damage to circuit elements of the BMS module 10 connected to the battery cell module 20, can reduce the inrush current by turning on/off the switching element included in the inrush current reduction circuit, and can reduce stress on the switching element Q1 through the circuit of the capacitor C17 and the third resistor R1 circuit connected in parallel to the switching element.

Although the present disclosure has been described with reference to some example embodiments, it should be understood by those skilled in the art that these embodiments are given by way of illustration only, and that various modifications, variations and alterations can be made without departing from the spirit and scope of the invention. Therefore, the scope of the invention should be defined only by the accompanying claims and equivalents thereto.

Embodiments described herein may be implemented as a method or process, a device, a software program, a data stream, or a signal. Although discussed in the context of a single type of implementation (in embodiments, discussed only as a method), features discussed herein may also be implemented in other forms (in embodiments, a device or a program). The device may be implemented by suitable hardware, software, firmware, and the like. The method may be implemented on a device, such as a processor that generally refers to a processing device including a computer, a microprocessor, an integrated circuit, a programmable logic device, etc. The processor includes a communication device such as a computer, a cell phone, a personal digital assistant (PDA), and other devices that facilitate communication of information between the device and end-users.

The present disclosure provides an inrush current reduction circuit capable of reducing generation of an inrush current that can be generated upon connection of a BMS module to a battery cell module.

In accordance with embodiments, an inrush current reduction circuit includes: a switching element connected between a power side of a BMS module and a power side of a battery cell module and having a gate connected to a ground side through a first resistor; a diode connected at one side thereof to a source of the switching element; a second resistor connected at one side thereof to the other side of the diode and connected at the other side thereof to the ground side through the first resistor; and a Zener diode connected in parallel to the second resistor.

The switching element may include a P-CH field effect transistor (FET).

A drain of the switching element may be connected to the power side of the BMS module.

The source of the switching element may be connected to the power side of the battery cell module.

An anode of the diode may be connected to the source of the switching element.

The Zener diode may be connected between one side of the first resistor and the other side of the diode.

An anode of the Zener diode may be connected to one side of the first resistor and a cathode of the Zener diode may be connected to a cathode of the diode.

The switching element may cut off an inrush current generated at an initial stage of connection between the BMS module and the battery cell module in an OFF state and may be turned on to allow only part of the inrush current to flow therethrough using voltage distribution by the first resistor and the second resistor if a voltage (Vgs) between both ends of the second resistor reaches a threshold voltage (Vth) or more, as a voltage level of the inrush current continues to increase.

The switching element may further include a capacitor and a third resistor connected in parallel to both ends of the switching element.

The capacitor and the third resistor may be connected in series to the switching element.

A voltage applied to an input terminal of the switching element may be adjusted depending on capacitance of the capacitor and resistance of the third resistor.

The inrush current reduction circuit according to the present disclosure can reduce generation of an inrush current upon connection of a BMS module and a battery cell module.

The inrush current reduction circuit according to the present disclosure can prevent damage to circuit elements by reducing generation of an inrush current that can be generated upon connection of the BMS module and the battery cell.

Although specific terms may be employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Thus, it will be understood by those of skill in the art that various changes in form and details may be made without departing from the spirit and scope of the present invention as set forth in the following claims.

What is claimed is:

1. An inrush current reduction circuit, comprising:
a switching element connected between a power side of a BMS module and a power side of a battery cell module and having a gate connected to a ground side through a first resistor;
a diode connected at one side thereof to a source of the switching element, wherein the one side is the anode side of the diode;

a second resistor connected at one side thereof to the other side of the diode and connected at the other side thereof to the ground side through the first resistor; and
a Zener diode connected in parallel to the second resistor.

2. The inrush current reduction circuit as claimed in claim 1, wherein the switching element includes a P-CH field effect transistor (FET).

3. The inrush current reduction circuit as claimed in claim 1, wherein a drain of the switching element is connected to the power side of the BMS module.

4. The inrush current reduction circuit as claimed in claim 1, wherein the source of the switching element is connected to the power side of the battery cell module.

5. The inrush current reduction circuit as claimed in claim 1, wherein the Zener diode is connected between one side of the first resistor and the other side of the diode.

6. The inrush current reduction circuit as claimed in claim 5, wherein an anode of the Zener diode is connected to one side of the first resistor and a cathode of the Zener diode is connected to a cathode of the diode.

7. The inrush current reduction circuit as claimed in claim 1, wherein the switching element cuts off an inrush current generated at an initial stage of connection between the BMS module and the battery cell module in an OFF state and is turned on to allow only part of the inrush current to flow therethrough using voltage distribution by the first resistor and the second resistor when a voltage (Vgs) between both ends of the second resistor reaches a threshold voltage (Vth) or more, as a voltage level of the inrush current continues to increase.

8. The inrush current reduction circuit as claimed in claim 1, wherein the switching element further includes a capacitor and a third resistor connected in parallel to both ends of the switching element.

9. The inrush current reduction circuit as claimed in claim 8, wherein the capacitor and the third resistor are connected in series to the switching element.

10. The inrush current reduction circuit as claimed in claim 8, wherein a voltage applied to an input terminal of the switching element is adjusted depending on capacitance of the capacitor and resistance of the third resistor.

11. An inrush current reduction circuit, comprising:
a switching element connected between a power side of a BMS module and a power side of a battery cell module and having a gate connected to a ground side through a first resistor;
a diode connected at one side thereof to a source of the switching element;
a second resistor connected at one side thereof to the other side of the diode and connected at the other side thereof to the ground side through the first resistor; and
a Zener diode connected in parallel to the second resistor, wherein the switching element further includes a capacitor and a third resistor connected in parallel to both ends of the switching element.

12. The inrush current reduction circuit as claimed in claim 11, wherein the capacitor and the third resistor are connected in series to the switching element.

13. The inrush current reduction circuit as claimed in claim 11, wherein a voltage applied to an input terminal of the switching element is adjusted depending on capacitance of the capacitor and resistance of the third resistor.

* * * * *